Jan. 21, 1964
E. F. JOHNSON ETAL
3,118,499
SECONDARY RECOVERY PROCEDURE
Filed Sept. 27, 1955
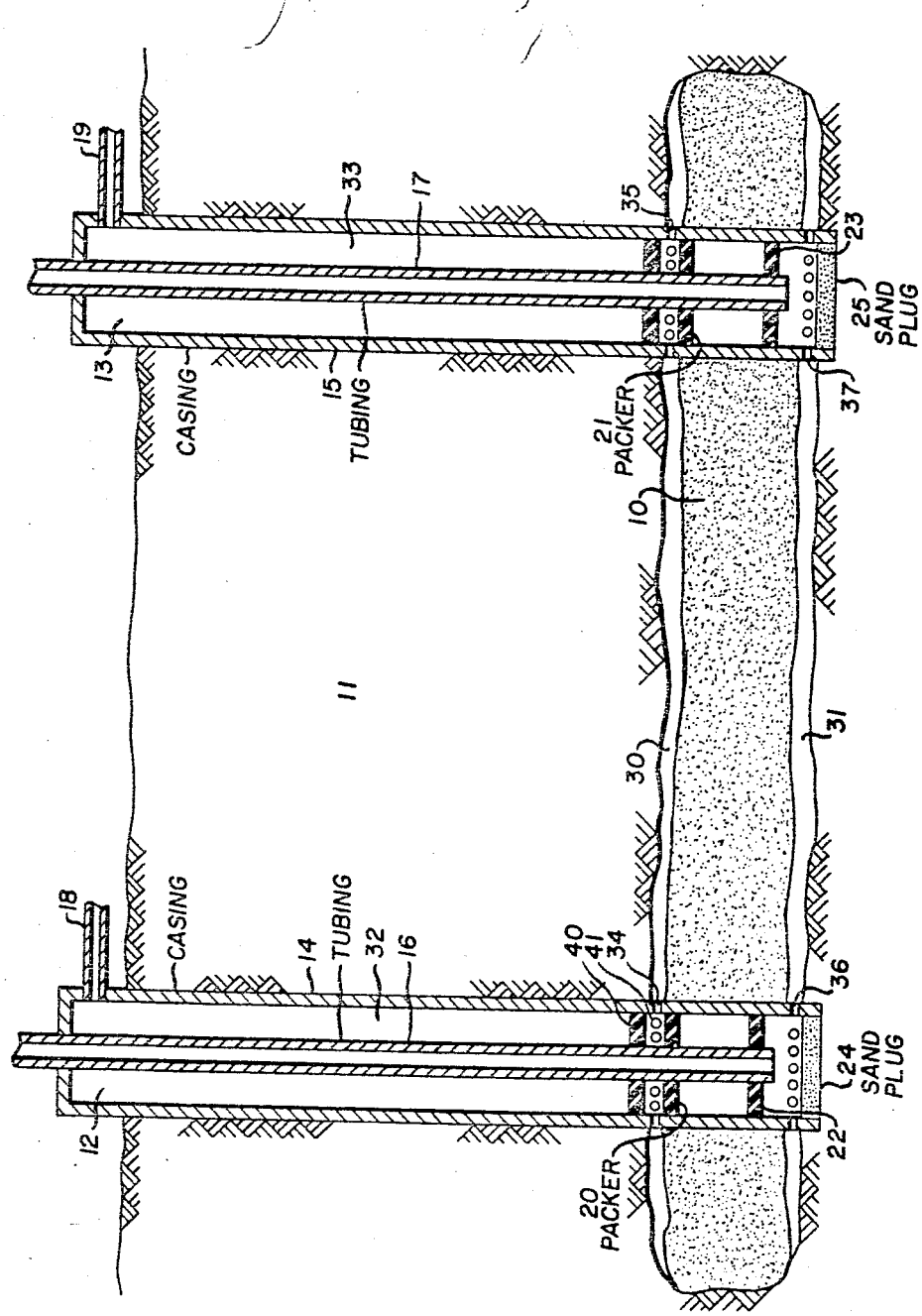
Edward F. Johnson
Richard E. Walker     Inventors
By James A. Reilly Attorney United States Patent Office 3,118,499
Patented Jan. 21, 1964

3,118,499
SECONDARY RECOVERY PROCEDURE
Edward F. Johnson and Richard E. Walker, Tulsa, Okla., assignors, by mesne assignments, to Jersey Production Research Company
Filed Sept. 27, 1955, Ser. No. 536,958
3 Claims. (Cl. 166—9)

This invention broadly relates to the recovery of oil from subterranean oil reservoirs. The invention has application to virgin fields as well as depleted fields, and it particularly relates to a secondary recovery procedure for obtaining oil from reservoirs that have passed the primary production stage. The invention is especially applicable to those reservoirs that possess at least some degree of vertical permeability, and it utilizes a sequence of controlled fracturing and flooding operations wherein a reservoir is converted from a radial or areal type flow pattern to a linear type flow pattern.

Recently, in the petroleum industry there has grown up an ever-increasing interest in the development of methods for recovering oil from known oil reservoirs and particularly those reservoirs that have ceased primary production on an economic basis. This growing interest is at least in part due to the rising cost of locating and exploiting new sources of oil. As a result of this interest a number of new procedures for increasing the amount and/or rate of recovery of oil from existing reservoirs have been developed and among the most promising and important of these procedures are the various flooding and fracturing processes.

Referring first to the flooding processes, these procedures generally call for the injection of a fluid at one or more points within a reservoir under conditions such that oil within the reservoir is displaced and driven toward one or more production points. Conveniently, the flooding fluid is pumped into a reservoir through one or more injection wells and is then driven through the reservoir toward one or more producing wells. The program is normally continued until the ratio of oil to flooding fluid produced is uneconomical or otherwise impracticable.

Fluids that are employed or that have been suggested for use as driving media in flooding procedures include various gases, condensable vapors and liquids. Some of the fluids that have appeared to be the most promising to date are natural gas, steam, hot gases of combustion, flue gas, various inert gases, water, liquefied carbon dioxide, liquefied normally gaseous hydrocarbons, and condensable hydrocarbon gases. Various combinations of these fluids have also proven to be of interest.

While flooding processes to date have met with a moderate degree of success and acceptance, these procedures unfortunately suffer from a number of serious disadvantages. First, programs of this type generally require a considerable length of time for their completion. Well spacings in oil fields are generally of the order of 500 ft. or more; and since the driving fluid in a flooding operation usually moves at a rate of no more than about 5–6 inches per day, it follows that periods of about 8 to 20 years are necessary to completely flood most reservoirs. Secondly, these procedures are generally characterized by relatively low "sweep" efficiencies in that less than about 75% of a reservoir is generally contacted by the flooding fluid. Third, a reservoir that has once been subjected to a flooding operation is not generally receptive to further recovery techniques.

Referring next to the fracturing procedures, these processes are generally employed to stimulate the production of oil reservoirs. As noted earlier, these procedures may be used on virgin reservoirs as well as reservoirs that have approached or passed the stage where primary production is no longer of any commercial interest. Briefly, the procedures are characterized by the use of hydraulic pressure to generate one or more fractures that extend into an oil-bearing formation from a well bore piercing the formation. Finely divided solids are injected into the fractures before the hydraulic pressure is released, and these solids serve to maintain the fractures in an open condition after the pressure is released. Upon release of the hydraulic fracturing pressure, oil and other fluids within the formation are able to flow in greater volume from the formation through the fracture into the well bore.

To date, the various fracturing procedures have enjoyed a moderate degree of success in obtaining improved oil recovery rates from subterranean reservoirs. Like the flooding procedures however, the fracturing techniques possess a number of serious shortcomings which detract from their commercial applicability. Thus, the amount of oil that is left in a reservoir after a fracturing operation and subsequent normal production procedures is still a very considerable proportion of the original oil content of the reservoir. Furthermore, the procedures are not universally applicable to all types of oil reservoirs.

In view of the above shortcomings of fracturing and flooding procedures, the petroleum industry possesses a continuing interest in developing still more satisfactory oil recovery methods. Specifically, it would be desirable to provide an oil recovery method which is capable of removing larger amounts of oil from subterranean oil reservoirs than are attainable with presently conventional procedures. It would further be desirable to provide a method of this type which would be much more rapid and economically attractive than the presently available methods.

With regard to these desiderata, it is a specific objective of the present invention to provide a method of obtaining more oil from subterranean reservoirs and at a greater rate of recovery than is now possible with presently conventional procedures such as fracturing and flooding. It is a further objective of the invention to provide a method which not only sweeps wider areas of a reservoir than do the present recovery procedures but which also permits exhaustion of the reservoir in far less time.

These and other objectives, which will become more apparent with the ensuing description, are attained in accordance with the present invention by a procedure which employs a particular sequence of fracturing and flooding steps. More specifically, the objectives are achieved in a reservoir by generating at least two vertically spaced fractures along separate bedding planes within the reservoir and thereafter driving a flooding fluid substantially vertically through the reservoir. The first named step is carried out by subjecting particular regions of a reservoir to high hydraulic pressures whereby fissures or fractures are created within the reservoir. The second step of the procedure is carried out by injecting a flooding fluid within one of the fractures and thereafter driving it vertically through the reservoir toward the other fracture. It will be noted that the fractures of interest to the invention may be generally considered to be of a horizontal disposition.

Preferably, the fractures that are generated in the first step of the process are created such that they extend from well to well throughout a reservoir. The flooding fluid in the second step can then be injected into one of the extended fractures at a point within each one of the wells; and substantially simultaneously, reservoir fluids including oil and the like may be withdrawn from the same wells at points where these wells contact the other extended fracture.

The invention may be better understood by reference to the attached figure in which an oil reservoir 10 lying within a section of the earth 11 is pierced by two wells 12 and 13. As depicted in the figure, reservoir 10 may be considered to be a relatively small reservoir with a well at each end of the reservoir. It will be understood, however, that this is merely a simplified case intended merely to illustrate the invention and that the invention has general application to more complex reservoir structures.

For the sake of the present description, it will be assumed that wells 12 and 13 are provided with casings 14 and 15 which extend from the earth's surface down to the bottom surface of the reservoir. As will be apparent hereinafter, only one and not both of the wells need actually pass entirely through the oil zone. It will further be assumed that wells 12 and 13 are provided with lengths of production tubing 16 and 17, respectively, which extend from the earth's surface down to a point preferably spaced just above the lower boundary or surface of the reservoir.

At the surface of the earth, the production tubing and the casing in each well preferably terminate in a suitable well head which is readily adapted for the separate flow of fluids within the production tubing and the annular space between the tubing and the casing. Thus, in the figure the production tubing in each well identified by the legends 16 and 17 pierces the upper end of the casing members 14 and 15 and is sealed thereto. The casings are conveniently provided with conduits 18 and 19 which permit flow of fluid in and out of the annular space between the well casing and the production tubing.

With the above assumptions and conditions in mind, the process of the invention is initiated by generating vertically spaced fractures along separate bedding planes within a reservoir. As illustrated in the figure, it is preferred that these planes be located along the upper and lower surface boundaries of a reservoir. Thus, fracture zone 30 in the figure lies along the upper edge of reservoir 10 and fracture zone 31 lies along the lower edge of the reservoir.

In generating the various fractures, the position at which each fracture is desired is first located, and the formation and casing at that position are then radially perforated at a plurality of compass points by means well known in the art. Thus, the usual perforating bullets, shaped charges and the like may be used for this step. Furthermore, any tubing within the hole may be moved as desired to facilitate the perforation operation.

Following perforation of the formation at each desired fracture point, a packer or other equivalent device such as packer 20 in the figure is set immediately below the perforated section 41. A second packer such as packer 40 is similarly placed immediately above the perforated section. This latter packer can conveniently be run into the well on tubing, and the tubing should extend through the upper packer so that fluid can be injected into the space between the packers. Both packers should be secured firmly to the formation so that there is no relative motion between the packers and the formation. The packers, however, should be free to move independently of each other a small distance.

Following the perforation and the placement of the packers at each fracture point, a low viscosity fluid is injected down the tubing so that it flows between the two packers and into the formation. When a sufficient pressure is exerted on the fluid, a substantially horizontal fracture such as fracture 30 is obtained.

Where the well to be fractured is a cased well, the casing can be cut or perforated as indicated earlier in the formation of the fracture. The fracturing of course can also be performed in an open hole. In any event once the fracture has been started, it is extended through the reservoir by pumping in additional fluid at a sufficiently high rate so that the rate at which the fluid is injected into the well is greater than the rate at which the fluid enters the formation from the generated fracture. Expressed otherwise, the rate of injection of the fracturing fluid should be such as to continuously increase the volume of the fracture.

One procedure for spreading an initial fracture lies in changing the characteristics of the injected fluid from a highly permeable fluid at the start of the fracturing operation to a fluid which has increased difficulty in penetrating the formation. Thus, the viscosity of the injected fluid can be increased by (1) using an immiscible liquid with surface tension characteristics such that it resists flow into the formation, or (2) using a gel, an emulsion or other such mixture as will not readily flow into the formation but rather into the extremely permeable fracture. The mixture, however, should be of a character such that it can at a subsequent time be altered so that it flows readily out of the fracture back into the well bore. Alternatively, the mixture should be of a nature such that without any change it will not block the flow of oil from fractured formation. The composition of fluids which will not readily penetrate a formation but which will be changed in their flow characteristics by aging or by the addition of acid or some other chemical means have been previously used in oil production, and their use as such is well known in the art.

In making each fracture in accordance with the present process, the hydraulic pressure within the fracture zone is continuously maintained until the zone has been extended as far as possible into the reservoir surrounding the point of origin of the fracture. Preferably, the pressure is exerted for a period of time and at a value sufficient to drive the fracture from well to well throughout an entire reservoir. Thus in the attached figure it is desirable that the fracture zones 30 and 31 illustrated there be extended so as to intersect both well 12 and well 13. It will be understood that the fracture zone between any two adjacent wells may be generated by originating the fracture from one or both of the wells. For example, referring again to the attached figure, zone 30 may be generated by initiating a fracture from well 12 and/or well 13. The fracturing pressure in each instance will usually be of a magnitude sufficient to cause the rocks or strata at the point of fracture to separate from one another and to lift the overburden.

Throughout the foregoing description of the fracturing phase of the present process, it has been stated at several points that a suitable fracturing fluid should be employed. Some of the characteristics of such a fluid have already been indicated. To further clarify this part of the description, however, it should be noted that in general the viscosity of the fluid employed to initially create the fracture should be of the order of 10 centipoises or less. Once the fracture has started, the viscosity and other characteristics of the fluid should be such as to provide very little penetration. The actual degree of penetration in any given case will depend upon the gas saturation, the absolute permeability, the viscosity of the oil in place, the difference between the fracturing pressure and the reservoir pressure, and other flow characteristics such as are well known in the art. As a general rule, however, it is desirable to maintain the ratio of the viscosity of fluid used to extend the fracture to the viscosity of the fluid initially in the reservoir at a value in the neighborhood of about 1000 to 1. The individual reservoir characteristics, the capacity of the pumps supplying the fracturing fluid, etc. will have a very distinct influence on the minimum viscosity ratio. For example in a high pressure, totally liquid saturated reservoir the viscosity ratio between the fracturing fluid and the reservoir fluid may be 10 or less.

Any one of a great number of liquids may be employed as fracturing fluids in the practice of the present invention. Thus, pure hydrocarbons, mixtures of hydrocarbons, alcohols, halogenated hydrocarbons, water and the like may be used to start the fractures. Petroleum fractions and crude oils, particularly those possessing viscosities of less than about 10 centipoises are especially preferred. Suitable petroleum fractions include diesel fuels, kerosene, gasoline, fuel oils, etc. Fluids used to extend the fractures can be of the same general nature as above and also emulsions, gels and the like.

In some fracturing operations it has been conventional practice in the art to suspend small solid particles, gelatinous materials, plastering agents and the like within the fracturing fluid in order to impart low filter loss quality to the fluid. In the present invention, however, it is preferred that these materials be omitted from the fluid until after the fracture has been initiated.

Insofar as the fracturing pressure that is to be employed in the process is concerned, it will be appreciated that the pressure will vary from place to place depending upon the nature of the cross section of earth in question as well as the depth of the reservoir and the like. It will further be appreciated that the necessary pumps, valves, fluid supply tanks and the like that are necessary for the operation must be supplied as is conventionally done in operations of this general type.

Having described how the various fractures in the present process are attained, reference is now again made to the attached figure in which fracture zones 30 and 31 are depicted as extending along bedding planes that are located at the upper and lower vertical surface boundaries of the reservoir 10. Each one of these fractures may be considered to have been formed by the technique just described. It will be noted that each one of the fractures may have been generated from one or both of the wells 12 and 13.

Having formed fractures 30 and 31, a length of tubing with attached packers is provided in each well. Thus, tubing 16 with attached packers 20 and 22 is provided in well 12, and tubing 17 with attached packers 21 and 23 is provided within well 13. In each case the upper packer on the tubing is positioned immediately below upper fracture zone 30, and the lower packer is positioned immediately above the lower fracture zone 31. Cement plugs 24 and 25 may be provided at the bottom of wells 12 and 13, respectively, in order to prevent bottom breakthrough. Casing perforations to provide fluid excess between the two wells and the fracture zones are indicated by the legends 34, 35, 36 and 37. If these perforations are not already present within the casing as for example by formation prior to the fracturing step, they should be formed before the flooding step is initiated. Conventional perforating guns, bullets, shaped charges and the like may be employed for their formation.

To maintain the fracture zones 30 and 31 in an open condition, it is desirable that suitable finely divided solid materials be injected into the zones in order to maintain the zones. This is conventionally done in the art by inserting "propping agents" such as sand, crushed shell, metal particles and the like within the zones. The manner of introducing these propping agents may be varied and selected as desired. For example, they may be incorporated directly within at least a portion of the fracturing fluids themselves, or they may be incorporated within an entirely separate fluid which is introduced within the fracture immediately following the injection of the latter fluid. Furthermore, the propping agents may be suspended within the carrier liquid in any convenient manner as by the use of suitable metallic soaps, peptizing agents, synthetic resins, and the like.

Once the propping agents have been introduced within the zones 30 and 31, the hydraulic pressures upon these zones may be relieved and the second phase of the process commenced. In this latter phase of the operation, as mentioned earlier, a driving fluid is introduced within one of the fracture zones and is directed through the reservoir toward the opposite fracture zone. The advantage of this type of flooding procedure is self-apparent when one realizes that a much larger portion of the reservoir is exposed to the action of the flooding fluid than is generally possible with presently conventional flooding techniques. As noted earlier, the latter techniques are generally carried out utilizing a radial, substantially horizontally directed type of flow pattern which must pass from one well to another before the program can be completed.

The flooding phase of the present process is continued until the driving fluid has completed its vertical traverse of the reservoir. Referring to the figure, it will be readily recognized that the flooding operation can be carried out by injecting a fluid into the upper fracture zone 30 and then driving it vertically downward to the fracture zone 31, or vice versa. In this connection, it is preferred that the flooding fluid be directed vertically downward through the reservoir when this fluid is lighter in specific gravity than the oil within the reservoir. Similarly, it is preferred that a vertically upward type of flow be employed when the driving fluid is heavier than the oil contained in the reservoir.

Among the fluids that are suitable for use in the flooding stage of the present invention are numerous liquids, vapors and gases. Thus, suitable liquids include water, aqueous brines, hydrocarbons, mixtures of hydrocarbons, petroleum fractions, crude oils, liquefied gases such as carbon dioxide and normally gaseous hydrocarbons, halogenated hydrocarbons, and the like. Suitable gases and vapors include steam, natural gas, air, flue gas, the combustion products from internal combustion engines, the inert gases, hydrocarbons and the like. Combinations of these classes of material may also be employed as desired. For example, it is contemplated that the best mode of practicing the invention utilizes a miscible fluid displacement system wherein a bank of a relatively low boiling hydrocarbon or hydrocarbon mixture is initially injected into the reservoir to be followed by a gas, such as natural gas, which is miscible with the solvent bank. Liquefied petroleum gas (L.P.G.) is especially contemplated for use in this type of precedure.

Having briefly enumerated a number of suitable flooding fluids, attention is now again directed to the attached figure for a more detailed description of the manner in which the flooding phase of the present process is preferably carried out. Thus, it will be assumed that the reservoir 10 has been fractured from well to well by the fracture zones 30 and 31 and that the oil within the reservoir is now subjected to the action of a natural gas-propelled bank of L.P.G. Thus, L.P.G. is supplied via conduits 18 and 19 and the annular passageways 32 and 33 to the perforations 34 and 35. From perforations 34 and 35, the L.P.G. then flows into the fracture zone 30, and due to the high relative permeability of this zone, rapidly occupies the entire zone. This influx of the L.P.G. will often cause a portion of the oil within reservoir 10 to be displaced from the reservoir. Any such displaced oil flows downwardly into fracture zone 31 and thence through perforations 36 and 37 into the portions of the wells 12 and 13 that lie immediately below packers 22 and 23.

The injection of L.P.G. into zone 30 is continued until an amount of this solvent has been injected into reservoir 10 sufficient to exist as a narrow band or bank throughout the flooding step. The amount of L.P.G. that is injected into zone 30 is further determined by the extent of oil recovery that it is desired to obtain. Thus, in most reservoirs it is contemplated that a bank of L.P.G. which is equal in volume to about 15% of the hydrocarbon volume of the reservoir must be injected in order to recover substantially all of the oil in the reservoir. With lesser amounts of L.P.G., progressively smaller oil recoveries are obtained.

Following injection of L.P.G. into zone 30, natural gas is now driven down through annular spaces 32 and 33 and thence through perforations 34 and 35 into reservoir 10. The injected gas serves to drive the L.P.G. ahead of it in the form of the aforesaid band or bank and thus scavenges reservoir 10 of its oil. The recovered oil, solvent and other reservoir fluids are forced into fracture zone 31 and are then withdrawn to the earth's surface as by means of perforations 36 and/or 37 and production tubes 16 and/or 17. Suitable pumps, valves, chokes, and the like may be used as desired to carry out and abet the operation. It is important to note that the pressure on the reservoir must be continuously maintained at a value such that the L.P.G. contained therein is substantially continuously maintained in a liquefied state.

Once the flooding operation has been completed, the reservoir may be purged with gas of any L.P.G. and thereafter abandoned or otherwise plugged, etc.

While the operation just described is contemplated to constitute the best manner for carrying out the present invention, it will be noted that numerous variations and modifications may be employed without departing from the spirit or scope of the invention. For example, the entire fracturing and flooding operation may be carried out from merely one well, or it may be preferably carried out from both wells. Similarly, in reservoirs employing a large number of wells, any desired proportion of the wells may be used for either the fracturing or flooding phases. Furthermore, more than two fractures may be generated within any given reservoir, as, for example, in those cases where the reservoir is characterized by a plurality of substantially separate and impervious strata.

Multiple fractures are also contemplated to be particularly effective when a heat-containing driving fluid such as steam or hot flue gas is employed. In such a case, it may be preferred to inject the driving fluid within a fracture which is located at a point vertically intermediate the upper and lower boundary fractures and to direct the fluid vertically upward and downward simultaneously within the reservoir. In this way heat losses to the overburden and the underburden are greatly minimized. Similarly, it may be desirable in some instances to inject a lighter-than-oil driving fluid within the upper boundary fracture and a heavier-than-oil fluid within the lower boundary fracture and to thereafter simultaneously drive these two fluids toward a centrally located fracture. The necessary apparatus for generating, maintaining and utilizing multiple fractures will be readily apparent to those skilled in the art; and a detailed discussion of these features is therefore not considered necessary in the present description.

While the foregoing description has been concerned with wells that have been previously provided with well casings, it will be realized that the invention also has application to uncased wells. In this instance, however, it may be necessary to cement off those portions of a well where fractures are not desired.

It will also be appreciated that numerous ancillary production techniques may be employed in conjunction with the present process. For example, the wall surfaces of the wells at the points within a producing formation where fractures are to be generated may be acidized or otherwise treated to render them more permeable to the fracturing and flooding fluids. Similarly, additional wells may be drilled within a reservoir, if it is necessary or desirable to have these wells in order to better carry out the process. Thus, in some formations, it may be difficult to generate well-to-well fractures due to extreme distances between the wells.

What is claimed is:

1. A process for applying water drive to an underground oil-bearing formation which comprises horizontally fracturing said formation at a lower level therein around at least one well; horizontally fracturing said formation at an upper level therein around at least one additional well so that the upper and lower fractures overlap; forcing water into the formation through the fractures at one level so as to drive oil in said formation toward the fractures at the other level; and recovering oil from said other level.

2. The process of claim 1 wherein water is forced into the fractures at said lower level and oil is recovered from the fratcures at said upper level.

3. A process for producing oil from an oil-bearing underground formation which comprises forming horizontal fractures in said formation at substantially different levels therein so that the fractures at one level overlap, at least in part, the fractures at the other level; injecting water into the fractures at one level to fill same and form a pancake-type water layer; and applying pressure to force water from said layer through said formation to the fractures at the other level so as to drive oil to last said fractures.

References Cited in the file of this patent

UNITED STATES PATENTS

| | | |
|---|---|---|
| 1,885,807 | Doherty | Nov. 1, 1932 |
| 2,173,556 | Hixon | Sept. 19, 1939 |
| 2,412,765 | Buddrus et al. | Dec. 17, 1946 |
| 2,593,497 | Spearow | Apr. 22, 1952 |
| 2,687,179 | Desmukes | Aug. 24, 1954 |
| 2,699,212 | Desmukes | Jan. 11, 1955 |
| 2,734,861 | Scott et al. | Feb. 14, 1956 |
| 2,754,911 | Spearow | July 17, 1956 |

FOREIGN PATENTS

| | | |
|---|---|---|
| 696,524 | Great Britain | Sept. 2, 1953 |

OTHER REFERENCES

Clark: Nineteen Key Factors to Hydraulic Fracturing of Oil and Gas Wells; Hydraulic Fracturing, pages 2 to 9 inclusive. Published by The Oil and Gas Journal and The Petroleum Publishing Co., Tulsa, Oklahoma.